Dec. 10, 1935.  G. F. CONNELLY  2,023,575
APPARATUS FOR REMOVING TREADS FROM TIRES
Filed Jan. 4, 1933  2 Sheets-Sheet 1
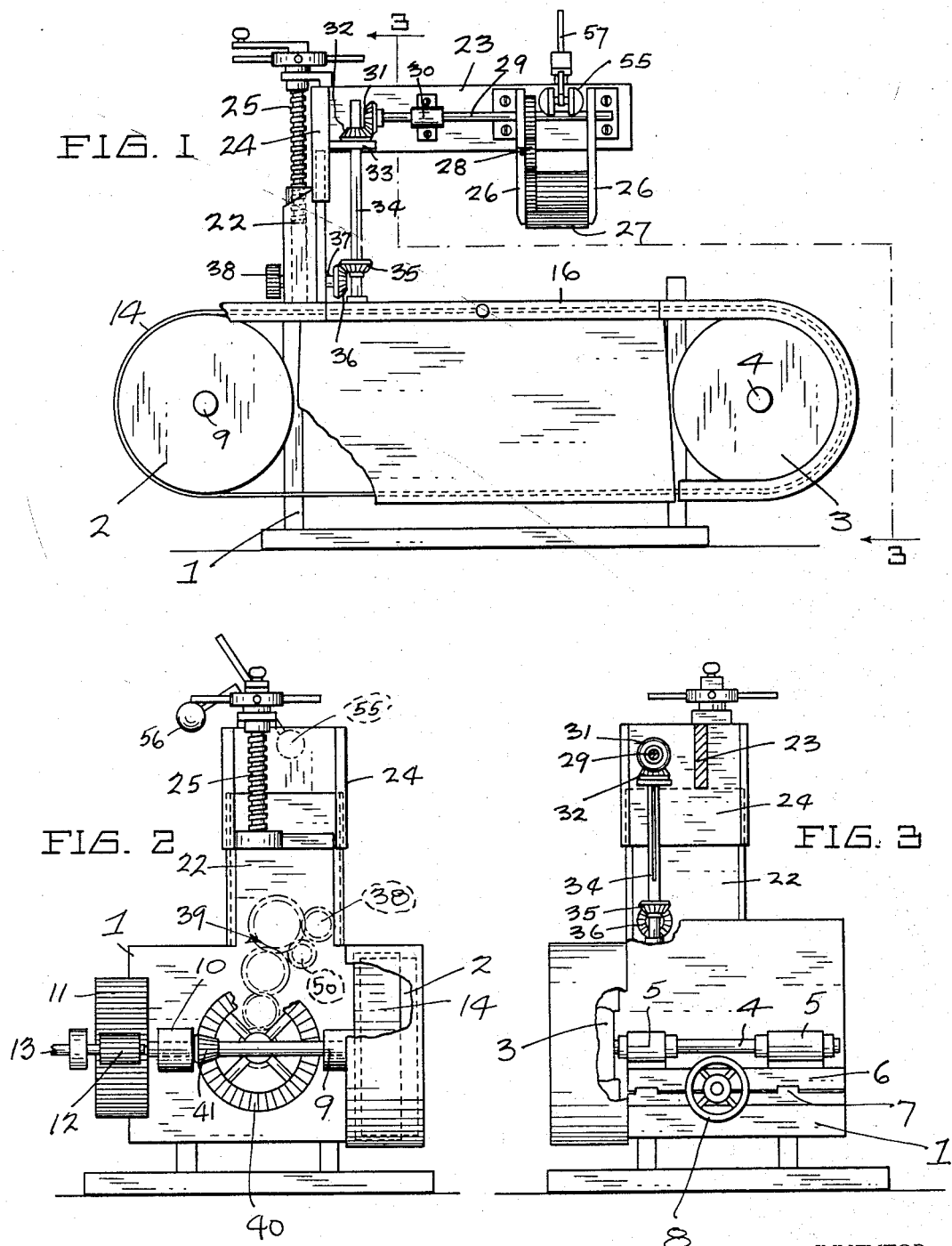
INVENTOR.
GEORGE F. CONNELLY
BY
ATTORNEY.

Dec. 10, 1935.　　　　　G. F. CONNELLY　　　　2,023,575
APPARATUS FOR REMOVING TREADS FROM TIRES
Filed Jan. 4, 1933　　　2 Sheets-Sheet 2
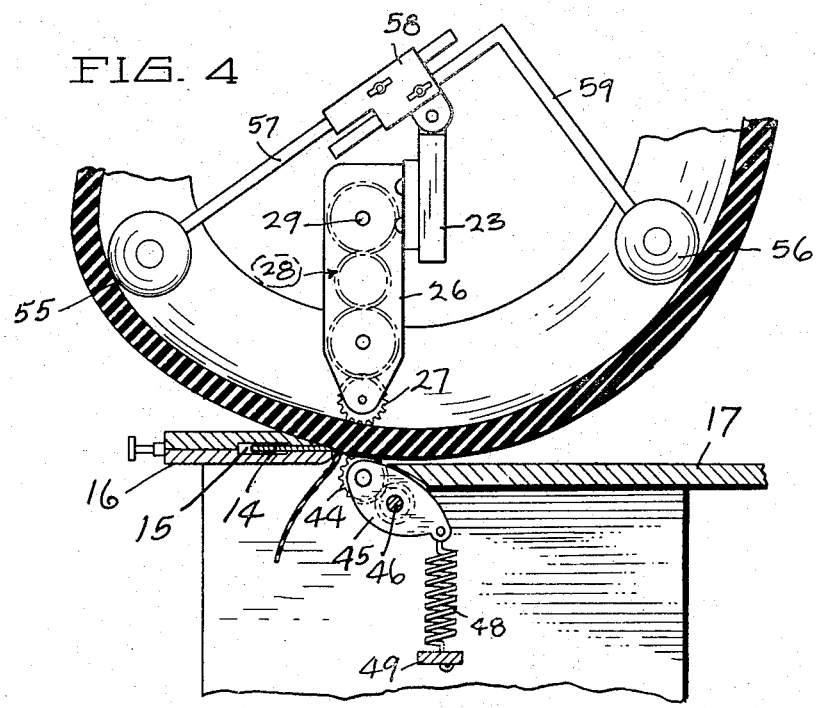
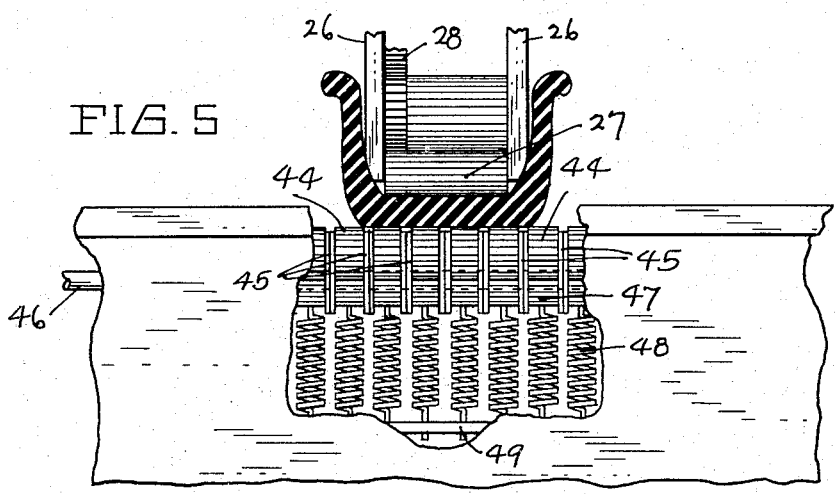
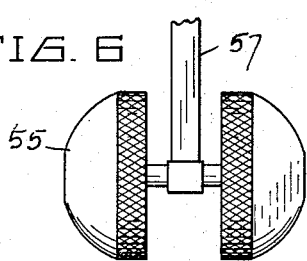
INVENTOR.
GEORGE F. CONNELLY
BY
ATTORNEY.

Patented Dec. 10, 1935

2,023,575

UNITED STATES PATENT OFFICE 2,023,575

APPARATUS FOR REMOVING TREADS FROM TIRES

George F. Connelly, San Francisco, Calif.

Application January 4, 1933, Serial No. 650,129

1 Claim. (Cl. 164—35)

This invention relates particularly to an apparatus for splitting such materials as leather and rubber into sheets or ribbons of selected thickness.

An object of the invention is to provide a splitting apparatus adapted particularly to split or remove the worn rubber tread of a pneumatic tire from the carcass of the tire, preliminarily to retreading the carcass.

A further object of the invention is to provide an apparatus for removing the tread surface of a pneumatic tire which will, by continuous operation, automatically cut any selected thickness of the worn tread surface from the tire, means being provided in the apparatus to maintain the normal tread surface of the tire in a flattened position during the period of time in which the said tread surface is being split from the carcass.

Other objects and advantages are to provide an apparatus for removing the treads from tires that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

In the accompanying two sheets of drawings:

Fig. 1 represents a side elevation of a splitting machine constructed in accordance with my invention.

Fig. 2 is an end elevation of Fig. 1.

Fig. 3 is an end elevation of Fig. 1 taken on the line 3—3.

Fig. 4 is a cross section, in enlarged detail, taken through the machine showing the method of operation of splitting the tread surface from the carcass of the tire.

Fig. 5 is a section taken through Fig. 4 on the line 5—5.

Fig. 6 is an enlarged front elevation of one of the guides for supporting the tire during the splitting operation.

In the art of stripping or removing tread surfaces from pneumatic tires, to put said tires in condition to be retreaded it is the customary practice to either cut the worn tread surface from the tire by hand, or to scrape the same off, or remove it by abrasive wheels, all of which methods depend entirely on the hand work and skill of the operator to effect removal of the tread surface, and as a result there is not a uniformity of product. My apparatus is designed to eliminate the hand work usually involved in removing the tread surface from the tire, and to perform the entire operation mechanically, with the result that the finished product is uniform, and the cost of removing the tread surface, as well as the period of time necessary to effect removal of said tread surface, is materially reduced below both the cost and time accruing where the tread removal is effected by hand.

In detail the construction illustrated in the drawings comprises a frame which is generally designated by the numeral 1, and which may be made of wood or metal. A pair of pulleys 2 and 3 are arranged at opposite ends of the frame 1, each of said pulleys being supported on shafts, the axes of which are horizontally disposed. The shaft 4 of the pulley 3 is rotatably supported in bearings 5 mounted on a sub-frame 6 which, in turn, is slidably guided on tracks 7 which are a part of the main frame 1. The sub-frame 6 is adjustable on the main frame 1, through the instrumentality of a hand wheel 8, whereby the position of the pulley 3 relative to the pulley 2 may be regulated as desired.

The pulley 2 is fixed to a shaft 9 which, in turn, is journaled in bearings 10 mounted on the frame 1. A gear 11 is keyed to the shaft 9 and said gear meshes with a driving gear 12 fixed to a shaft 13 which is connected to a motor or other prime mover.

A band knife 14 is mounted around the peripheries of the pulleys 2 and 3, and the upper run of said knife, between the pulleys 2 and 3, is confined within a guideway 15 formed in a housing 16, mounted on the upper side of the frame 1. The housing 16 is formed in separable halves so that the band knife may be readily removed therefrom and said housing 16 acts to support the upper run of the band knife on a true horizontal plane during the period of time that said knife is cutting the tread surface from a tire, as will be hereinafter explained.

A table 17 is arranged in spaced relation to the cutting knife, the surface of said table 17 being arranged on a plane parallel to the plane of movement of the upper run of the band knife 14.

The frame 1 at one end thereof, is provided with a vertical guide standard 22, on which a beam 23 is slidably guided at 24, whereby said beam may be raised or lowered relative to the plane of the band knife 14. The beam 23 is provided with a threaded shaft 25 rotatably journaled therein, which shaft is threadedly engaged with the standard 22 to effect vertical adjustment of the beam 23.

The free end of the beam 23 is provided with depending parallel brackets 26 thereon, which brackets 26 project downwardly from the beam 23 toward the cutting knife 14. A roller 27 has its opposite ends rotatably journaled in the ends of the depending brackets 26, said roller 27 being in the form of a gear. A chain of gears 28 are journaled on one of the brackets 26 in meshing engagement with each other and with the roller 27. One gear of the gear chain 28 is fixedly mounted on a shaft 29 journaled in bearings 30 secured to the beam 23. The shaft 29 is provided with a bevel gear 31 thereon, which is arranged in meshing engagement with the bevel gear 32 rotatably mounted in a support 33 which is fixed on the beam 23. A shaft 34 is slidably splined in the bevel gear 32, to permit the bevel gear 32 to slide lengthwise on the shaft 34 as the beam 23 may be raised or lowered. The shaft 34 is provided with a bevel pinion 35 thereon which is driven by a bevel pinion 36 fixed on a shaft 37, which is journaled in the standard 22. The other end of the shaft 37 is provided with a spur gear 38 thereon, and said spur gear 38 is arranged in meshing engagement with a chain of gears, generally designated by the numeral 39, all of which gears are actuated by the bevel gear 40, which is rotatably mounted in one end of the frame 1 and meshes with the bevel driving pinion 41 mounted on the drive shaft 9. The driving power from the shaft 9 is thus effectively transmitted thru the chain of gears to the roller 27, to rotate said roller at a relatively slow speed, as contrasted with the high rate of speed at which the band knife 14 moves.

The band knife 14 and table 17, as heretofore recited, are arranged in planes parallel with each other. At a point below and in vertical alignment with the roller 27, the knife 14 and table 17 are spaced apart. Within this space and on a plane substantially flush with that of the upper surface of the table 17, I have arranged a plurality of yieldable pressure rollers 44, each of which rollers is of relatively short length and each roller has its opposite ends journaled in a pair of supporting plates 45 arranged on opposite sides thereof. Each pair of supporting plates 45 is fulcrumed on a cross shaft 46 and on said cross shaft 46 are fixed a plurality of gears 47, there being one of said gears 47 in meshing engagement with each of the rollers 44. A tension spring 48 is connected at one end to each pair of plates 45, and at the opposite end said spring is secured to a bar 49 fixed on the frame 1. Each of the rollers 44 is thus free to yield in a vertical direction, independently of the adjacent rollers, in accordance with the pressures and forces directed onto said rollers from above. The shaft 46, at one end, is provided with a gear 50 thereon which meshes with a chain of gears, designated by the number 39, and is rotated thereby.

The upper pressure roller 27 and the lower pressure rollers 44 are rotated in the same direction for the purpose of passing therethru any article which might be engaged with either or both of said rollers. Both the upper and lower pressure rollers rotate at the same rate of speed, and will positively move any article which might be held therebetween.

In order to remove the worn tread surface from the curved exterior of the conventional and usual pneumatic tire carcass, the operator first raises the beam 23 on the standard 22 to a point where a sufficient clearance is provided below the upper pressure roller 27, and the upper surface of the table 17. The circumference of the tire is arranged at right angles to the cutting edge of the knife 14 in order that the knife 14 may cut the tread from the tire on a line tangential to the circumference thereof. When the tire has been arranged in the approximate desired position, the beam 23 is lowered in order to move the pressure roller 27, and its supporting brackets 26 into the interior of the tire. The side edges of the brackets 26 are beveled to facilitate the entry of the upper pressure roller into the inside of the tire. As the upper pressure roller 27 is lowered into the interior of the tire, the tire is gradually flattened from its conventional curved shape until the entire tread portion of the tire is flattened out against the lower pressure roller 44, as is clearly shown in Fig. 5. The tread surface of the conventional tire extends a substantial distance around on the sides of the tire, and the overall length of the pressure roller 27 is such that the tread surface of the tire can be flattened out. When the upper pressure roller has been brought down to a point where the tread surface has been sufficiently flattened, the table 17 on which the tire rests, is so arranged with respect to the knife 14 that a selected and predetermined thickness of the tire tread may be cut from the tire, as the said tire is advanced into contact with the knife. In order to maintain the tire in a proper position with respect to the cutting knife, I have arranged a pair of guide members 55 and 56 on opposite sides of the cutting knife 14.

The guide 55 consists of a pair of rollers journaled on a bar 57, and the bar 57 is adjustably mounted in a support 58 fixed on the beam 23. Similarly, the guide 56 is mounted on a bar 59 which is also adjustably located in the support 58 on the beam 23. The guides 55 and 56 have a contour which conforms to the inner contour of the tire, and said guides 55 and 56 serve to hold the tire in proper alignment with the pressure rollers 27 and 44. In order to split or sever the tread surface from the tire, the band knife 14 is started in movement, as are the pressure rollers 27 and 44. The pressure rollers 27 and 44 feed or advance the tread portion of the tire toward and against the cutting edge of the knife 14, and the pressure rollers 27 and 44 automatically cause the tire to be revolved on its normal vertical axis until a desired thickness of the worn tread has been removed. If desired, the operator may continue to remove the worn tread from the tire by lowering the upper pressure roller 27 toward the table 17, whereby additional tread surface will be compressed or squeezed in a position to be forced into contact with the cutting knife 14. After a desired amount of tread surface has been removed from the tire, the band knife and pressure rollers are stopped from rotating, the upper pressure roller 27 and supporting guides 55 and 56 are withdrawn from the tire, and the tire is removed from the machine with its entire tread surface removed in a substantially uniform manner.

By the apparatus the tread surface of the tire is removed without deforming or mutilating the natural shape of the tire so that it may be retreaded. Obviously the tire could be cut completely through at any point, and the tire unrolled into a flat ribbon-like strip and in the flat strip-like form it could be fed through a splitting machine, to cut the worn tread from the carcass, but it would thereafter be economically impracticable to restore the strip to a tire-like form.

The invention herein described refers to apparatus for removing treads from tires like that disclosed in my Patent No. 1,945,883, patented February 6, 1934.

Having thus described this invention, what I claim and desire to secure by Letters Patent is:

An apparatus to cut the tread from a pneumatic tire casing, while maintaining the casing in its circular shape, consisting of a frame; a driven roller on the frame having a portion of its circumference engageable with the tread of the tire; a beam adjustably supported on the frame and overlying said roller; a driven roller on said beam arranged parallel to and above said first mentioned roller; means to adjust the position of the beam to move the roller thereon relative to the roller on the frame, said beam roller being engageable with the interior of a tire to flatten the curvature of the tread portion thereof onto the roller contacting the outside of the tread; a movable flat knife tangentially engageable with the flattened tread to cut the tread from the tire; and means to rotate the rollers on the frame in unison to revolve the tread of the tire into contact with the knife.

GEORGE F. CONNELLY.